United States Patent
Tujkovic et al.

(10) Patent No.: US 9,647,335 B1
(45) Date of Patent: May 9, 2017

(54) JOINT BEAMFORMING IN POINT-TO-POINT WIRELESS COMMUNICATION NETWORKS

(71) Applicant: Facebook, Inc., Menlo Park, CA (US)

(72) Inventors: Djordje Tujkovic, Mountain View, CA (US); Krishna Gomadam, San Jose, CA (US)

(*) Notice: Subject to any disclaimer, the term of this patent is extended or adjusted under 35 U.S.C. 154(b) by 0 days.

(21) Appl. No.: 14/986,490

(22) Filed: Dec. 31, 2015

(51) Int. Cl.
*H04B 7/06* (2006.01)
*H01Q 3/34* (2006.01)

(52) U.S. Cl.
CPC ............. *H01Q 3/34* (2013.01); *H04B 7/0617* (2013.01)

(58) Field of Classification Search
CPC .. H04B 7/0617; H04B 7/0452; H04B 7/0695; H04B 7/024; H04B 7/026; H04B 7/0408
USPC ......................................................... 375/267
See application file for complete search history.

(56) References Cited

U.S. PATENT DOCUMENTS

| | | | | |
|---|---|---|---|---|
| 2009/0067533 A1* | 3/2009 | Yuan | ..................... | H04B 7/0697 375/267 |
| 2009/0167605 A1* | 7/2009 | Haskell | ..................... | H01Q 3/36 342/372 |
| 2013/0154803 A1* | 6/2013 | Koch | ................. | G06K 7/10356 340/10.1 |
| 2016/0211577 A1* | 7/2016 | Miller | ..................... | H01Q 3/24 |

* cited by examiner

*Primary Examiner* — David S Huang

(57) ABSTRACT

A system for transmitting information between nodes in a point-to-point wireless communication system. The system includes a node with an antenna array and a beamformer that is controllable to orient a main lobe of the antenna array in a desired direction. A spacing of the plurality of antenna elements in the array is adjustable to control a direction of a grating lobe of the antenna array to complete a communication link with a node in the network. Signals are simultaneously transmitted in the direction of the main lobe and the grating lobe to different nodes in the network.

20 Claims, 4 Drawing Sheets

US 9,647,335 B1

JOINT BEAMFORMING IN POINT-TO-POINT WIRELESS COMMUNICATION NETWORKS

TECHNICAL FIELD

The present disclosure relates to wireless communication networks and in particular to methods of simultaneously transmitting to different nodes in wireless communication networks.

BACKGROUND

Internet Protocol (IP) traffic is generally carried on wired networks, e.g., fiber optic or cable networks or on wireless ("WiFi") networks, e.g., IEEE 802.11. Wired networks work well when the cable infrastructure is already present or can be easily installed. However, there are many locations where it is either not practical or too expensive to dig up streets or run cables overhead. To alleviate this problem, wireless networks have been proposed to extend the reach of the network to locations that cannot be connected by physical cables. Wireless networks can include a network of nodes and client computing devices ("clients"). Some of the nodes can include a connection to a wired network and are sometimes called "base stations" or "backhaul nodes." Clients can include fixed or mobile computing devices that communicate wirelessly with the nodes. Wireless networks can extend reach in some of these areas, but presently used WiFi technology can have problems with distance or bandwidth.

DETAILED DESCRIPTION

The present disclosure is directed to systems for simultaneously transmitting signals to different nodes in a point-to-point wireless communication network. In various embodiments, an intermediary node simultaneously transmits signals to other nodes in the network using a multiple antenna array. The antenna array can have multiple antenna elements. In some embodiments, the spacing between the antenna elements in the array is adjustable so that a grating lobe (also known as a side lobe) of the antenna radiation pattern is oriented to a second node in the network while a main lobe is oriented to a first node. In some embodiments, the signals transmitted by the node are network coded to reduce the number of transmissions needed to exchange information between nodes.

In accordance with another aspect of the present disclosure, a mechanism is described for selectively changing the spacing between the antenna elements. The mechanism is operable to change the spacing between antenna elements in linear or two dimensional antenna element arrays.

In some embodiments, the nodes of the network are configured to transmit and receive wireless signals with other nodes and clients in a wireless communication network. Each node includes include a processor, a transceiver for transmitting and receiving wireless signals and an antenna. At least some of the nodes in the network include multiple antennas in a linear or two-dimensional array that enable the node to change its transmit and receive directions by using beamforming techniques. Beamforming involves managing the energy of a sensor or antenna array in one or more specified directions to increase or decrease gain in the specified directions. A memory in the node stores program instructions that are executable by the processor to determine or read directions in which signals should be transmitted from the node or received at the node. A beamformer in the node is controllable by the processor to control the direction at which signals are transmitted by the node in order to complete a communication link with another node in the network. One skilled in the art would recognize how to implement and use a beamformer.

Figure 1:
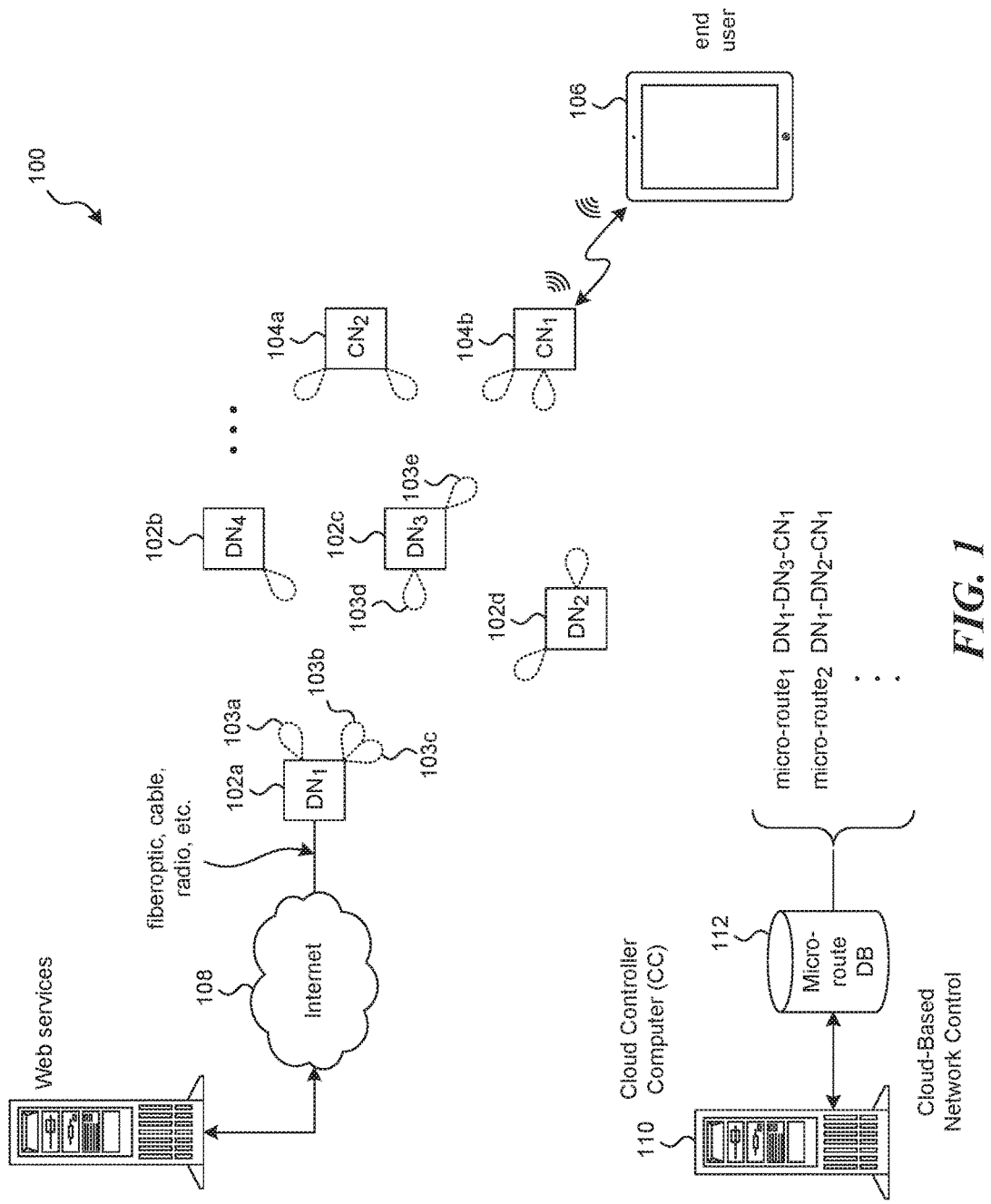
FIG. 1 is a block diagram illustrating a point-to-point wireless communication network in accordance with various embodiments of the present disclosure.

Turning now to the figures, FIG. 1 shows one embodiment of a point-to-point wireless communication network. The network 100 includes a number of destination nodes (DN) 102a, 102b, 102c, 102d, etc. and a number of client nodes (CN) 104a, 104b, etc. The destination nodes exchange IP packets between themselves and the client nodes. The client nodes transmit and receive IP packets between themselves and the destination nodes as well as to a number of end user terminals 106 (such as, but not limited to, wireless enabled devices including computers, tablets, smart phones, household appliances, or any other device capable of transmitting and receiving wireless IP data). The destination nodes 102 can be mounted on utility poles, buildings, etc. and can transmit point-to-point wireless signals over a distance of approximately 200-300 meters, depending on environmental conditions. The client nodes 104 are generally located in retail/office establishments, in homes, or in other structures and are adapted to transmit and receive IP packets to and from the end users. In some embodiments, the IP packets are sent according to a standardized protocol such as IEEE 802.11ad. However, it will be appreciated that any number of other IP protocols such as WiMAX 802.16 could be used.

In the network 100, at least one destination node (e.g., node 102a) is coupled to a physical cable that carries IP data to and from a computer communication link 108 (e.g., the Internet or a private communication link). IP packets that are destined for an end user 106 are received from the communication link and are transmitted via one or more routes to the client node 104b, which is in communication with the end user 106. For example, packets may be sent via a route including nodes $DN_1 \rightarrow DN_3 \rightarrow CN_1$ or via a second route including nodes $DN_1 \rightarrow DN_2 \rightarrow CN_1$ depending on the radio frequency path conditions that may exist at the time of transmission.

In some embodiments, transmissions are carried on a nonregulated 60 GHz radio frequency spectrum band. At these frequencies, the ability to transmit and receive packets is easily influenced by changing atmospheric conditions (wind, rain, etc.) or by interfering objects (e.g., buses, tree limbs, or other objects passing in and out of the line of sight). Therefore, the best route to complete a communication link between a transmitting and a receiving node in the network may change over time.

In the embodiment shown, a cloud controller computer 110 includes a database 112 that stores a list of possible routes that have been determined to complete a communication link between the various nodes of the network. The cloud computer 110 can communicate with each of the nodes by sending packets that are addressed to the nodes to control the overall operation of the network. As an example, the cloud computer 110 can transmit routing tables or information that can be used to construct routing tables, wherein the routing tables specify the possible routes. The routing tables may also specify a time of use, e.g., to respond to the changing atmospheric or other environmental conditions that may exist when packets are communicated.

To improve the communication path between each of the nodes, to reduce interference, and to increase the throughput of the network, the destination and client nodes generally include multiple antennas that can be used to control the transmit and receive directions of the node, and beamforming techniques can be used with these antennas. As will be appreciated by those skilled in the art of radio frequency communications, the radio frequency signals transmitted by each of the antennas can be selectively delayed by beamforming techniques in order to direct the main lobe (i.e., the bulk of the transmitted signal power) in a desired direction. Similarly, signals received by the antennas can be delayed and summed using beamforming techniques to change the effective listening direction of the receiver. In the embodiment shown in FIG. 1, destination node $DN_1$ 102a can beamform its transmitted and received signals in different directions 103a, 103b, 103c. Similarly destination node $DN_3$ 102c can beamform its transmitted and received signals in directions 103d and 103e.

In a simplistic point-to-point wireless communication system having three nodes A, B and C (not illustrated), four transmissions are required to exchange information between node A and node C that passes through an intermediary node B. For example, a data packet is first sent from node A to node B. Node B forwards the packet to node C. Node C sends a data packet to node B and node B then forwards the packet to node A.

The number of transmissions required to exchange information between nodes A and C can be reduced by cleverly encoding the data that node B transmits. This is referred to as "network coding." In some embodiments, network coding can be used to reduce the number of transmissions required to exchange information between two nodes that pass through an intermediary node from four transmissions to three. In some embodiments, the number of transmissions needed to exchange information between nodes is accomplished by having node B simultaneously transmit signals to nodes A and C. While an omni-directional antenna could be used to direct signals to both nodes, such an antenna may cause interference with other nodes in the network. Therefore, the signals from node B are steered with beamforming. While dual geometric beamforming can be used to steer the signals in desired directions, such beamforming typically incurs a loss in the overall power of the signals that are transmitted. The loss in signal power means that the nodes have to be placed closer together thereby increasing the cost of the network to cover the same geographic area, or that additional error checking techniques need to be used to ensure reliable communication, thereby decreasing network throughput. Therefore, there is a need for a wireless communication network that can simultaneously direct signals to desired nodes with a reduced loss of signal power.

Figure 2:
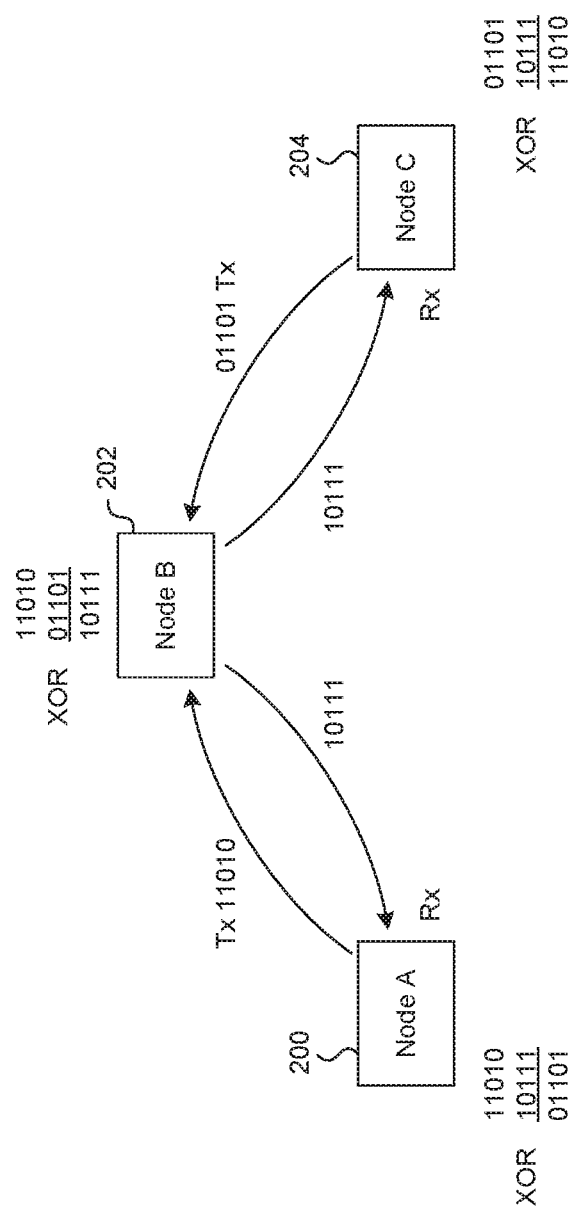
FIG. 2 is a block diagram illustrating an embodiment of a system for transmitting information between nodes in a point-to-point wireless communication network using network coding and beamforming techniques in accordance with various embodiments of the present disclosure.

FIG. 2 illustrates a technique for network coding. In the figure, a simple point-to-point wireless communication network has three nodes 200, 202 and 204. Node 200 desires to send information to node 204 and node 204 desires to send information to node 200. Due to the topology of the network, the information to be sent between the nodes 200 and 204 passes through the intermediary node 202.

In the embodiment shown, node 200 wants to send the binary string 11010 to node 204. Node 204 wants to send a binary string 01101 to node 200. As discussed above, without network coding this exchange of information usually requires four transmissions: 1) a first transmission from node 200 to node 202; 2) a second transmission from node 202 to node 204; 3) a third transmission from node 204 to node 202 and 4) a fourth transmission from node 202 to node 200. With network coding, node 200 sends its information to node 202 and node 204 sends it information to node 202. The intermediary node 202 then encodes the received information in such a way that node 202 can transmit the coded information to nodes 200 and 204 at the same time. The information is coded such that node 200 can decode the received signal and retrieve the information that was transmitted from node 204 and node 204 can decode the same received signal and retrieve the information that was transmitted from node 200.

In some embodiments, intermediary node 202 performs an exclusive or (XOR) operation on the information received from node 200 and the information received from node 204. The XOR'd signal is then simultaneously transmitted to both nodes 200 and 204. In the example shown, node 202 performs an XOR operation on the binary string 11010 received from node 200 with the binary string 01101 received from node 204 to produce the string 10111. Node 202 simultaneously transmits this signal to nodes 200 and 204. Each of the nodes 200 and 204 receive the signal and performs an XOR operation on the received signal with the signal that the node previously sent. For example, node 200 performs an XOR operation on the signal it received from node 202 (10111) with the binary string it sent (11010) to produce 01101, which is the string that was sent by node 204. Similarly, node 204 performs an XOR operation on the signal it received (10111) with the signal it sent (01101) to produce 11010, which is the signal sent by node 200. Thus, with network coding, information can be exchanged between nodes with fewer transmissions than if the signals were sent sequentially between the nodes.

Thus, an intermediate node can simultaneously transmit a common coded signal to two other nodes, and each of those nodes can decode the common coded signal to identify the signal the other node originally sent. As previously discussed, although an omni-directional antenna could be used, such an antenna may cause interference with other nodes in the network. Dual beam geometric beamforming could also be used to beamform signals in the direction of each of the nodes. However, dual beam geometric beamforming incurs a loss (e.g. 3 dB) that reduces the power of the signals that reach the nodes. This loss can cause reduced bandwidth.

Figure 3:
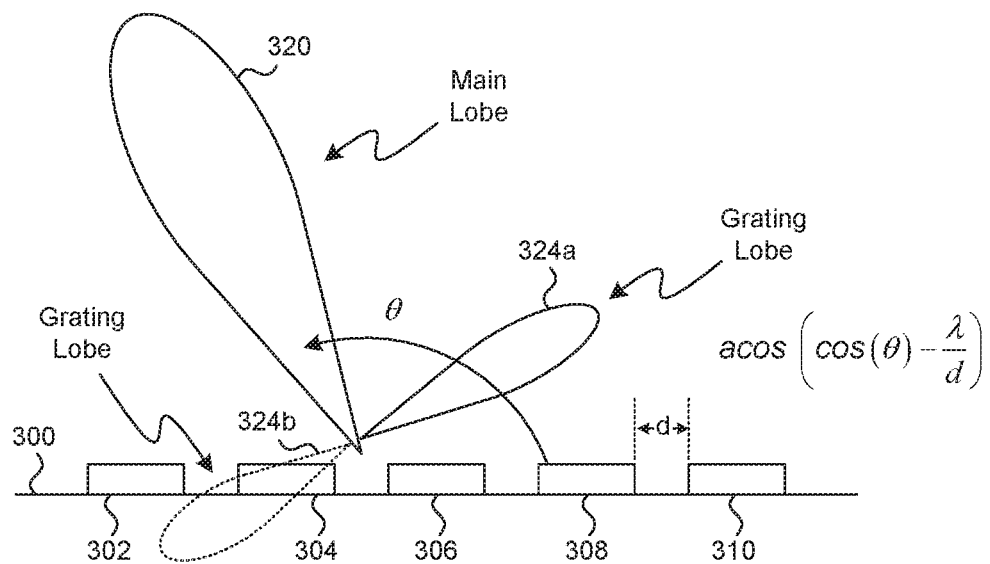
FIG. 3 is a plot diagram of a main lobe of an antenna beam pattern and a grating lobe created by a linear array of antenna elements.

To reduce the losses that typically occur with dual beam geometric beamforming, the signals from the intermediary node are transmitted in a manner that advantageously utilizes the grating lobes. As will be understood by those skilled in the art, signals from an array of antenna elements can be directed in a desired direction by delaying the time which the signal is transmitted by each antenna element. FIG. 3 shows an antenna 300 with an array of antenna elements 302, 304, 306, 308, and 310 that are each separated by a distance "d." A main lobe 320 (e.g., a majority of the signal power) can be oriented in a direction 8 (measured from a front face of the array) by delaying the time at which a signal is transmitted from each antenna element. Because of the spacing of the antenna elements, the antenna will also have grating lobes 324a and 324b, that are oriented in non-desired directions. The angle of the grating lobes is given by the equation $$a\cos(\cos(\theta)-\lambda/d)$$

In this equation, the symbol $\lambda$ represents the wavelength of the employed signal. As can be seen from the equation, the angle of the grating lobes can be adjusted by changing the distance "d" between the antenna elements. In some embodiments, the distance d is selected so that one of the grating lobes (e.g. 324a) is oriented in a direction to communicate with a node in the point-to-point wireless communication network. This direction may be in the line-of-sight. Alternatively, the direction may be in a non-line-of-sight direction that still allows a communication link between the nodes to be completed. The non-line-of-sight direction may be determined by radio frequency propagation modeling, by using test signals or by other mechanisms.

When two nodes exchange packets (e.g., nodes 200 and 202), the direction of the grating lobe and the gain of the grating lobe can adjusted to complete a communication link with the node.

Figure 4:
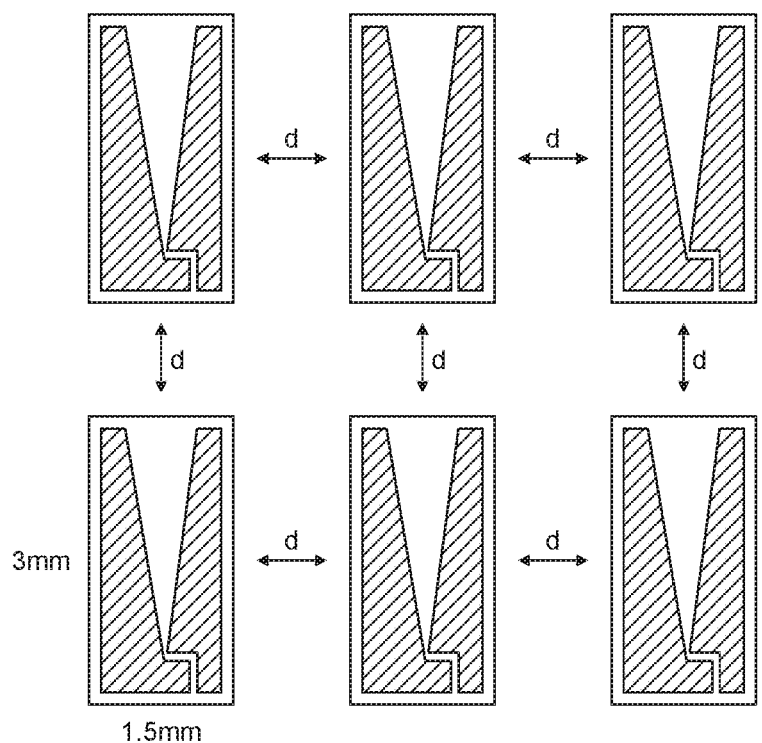
FIG. 4 is a face view of a partial two-dimensional array of movable antenna elements that are adjustable by a node in order to advantageously change the orientation of a grating lobe of the antenna pattern.

FIG. 4 shows a two dimensional array of antenna elements each separated by a distance "d". By changing the distance between adjacent elements, the orientation of the grating lobes the antenna array can be selectively changed to align in a desired direction.

Where the placement of the nodes in the network is fixed, the distance between the antenna elements in an intermediary node can be fixed such that a grating lobe is oriented in a desirable direction to communicate with another node in the network.

In another embodiment, where a node has to transmit to different pairs of nodes, the distance between the antenna elements can be dynamically changed by a mechanism that adjusts the distance between adjacent elements. In some embodiments, the antenna elements can be densely packed and a subset of the antenna elements can be selectively energized to vary the distance "d." As an example, in an array of 16 antenna elements each having a distance "d" between them, selectively energizing every other antenna element would cause the distance between each two of the 8 energized antenna elements to be twice the distance "d" (i.e., 2d). In various embodiments, various combinations of antenna elements can be selectively energized to vary the grating lobes.

Figure 5:
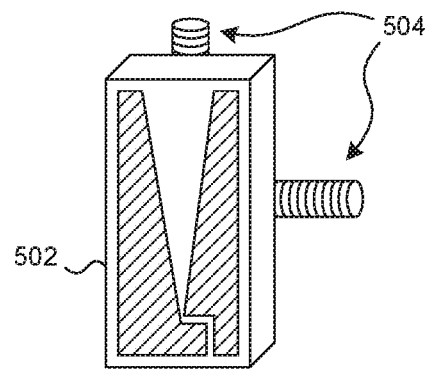
FIG. 5 is a perspective diagram of a mechanism for moving a single antenna element with respect to other antenna elements in an antenna array in order to adjust the orientation of a grating lobe in accordance with an embodiment of the present disclosure.

FIG. 5 shows an antenna element 502 and a mechanism 504 connected to the antenna element that can move the antenna element in one or more directions. For linear arrays, the mechanism can move the antenna element in a single direction in the plane of the antenna. For two-dimensional arrays, the mechanism can move the antenna element in two or more directions relative to the other antenna elements in the array. The mechanism can include electromechanical linkages adapted to cause the distance between the antenna elements to be varied. Embodiments with electromechanical linkages to vary the distance between antenna elements can be used when the grating lobes do not need to be adjusted frequently or rapidly.

Figure 6:
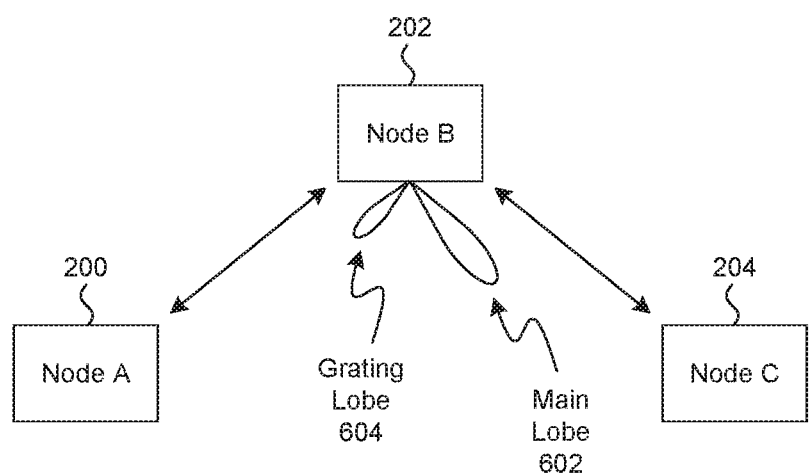
FIG. 6 is a plot diagram illustrating an embodiment of a wireless communication network including nodes that are positioned to align with a main lobe and a grating lobe of an antenna array.

FIG. 6 shows a point-to-point wireless communication network that is constructed in accordance with an embodiment of the present disclosure. Continuing with the example described above, the network includes three nodes 200, 202 and 204 where node 202 is an intermediary node between nodes 200 and 204. In this embodiment, node 202 has an array of antenna elements where the distance between the antenna elements is selected such that a grating lobe 604 of the antenna array is oriented towards the node 200. Signals that are to be transmitted towards the node 204 are controlled by beamforming the main lobe of the antenna transmit pattern towards the node 204. During use, signals are simultaneously transmitted by the node 202 in the direction of the main lobe and the grating lobes of the antenna array.

In some embodiments, each node includes a processor and a memory unit that stores a routing table with preferred beamforming directions (for both the main lobe and grating lobes) in order to communicate with other nodes in the network. When a node receives a packet to be transmitted to other nodes, the processor looks up the beamforming directions and adjusts the spacing of the antenna elements as needed in order to orient the grating lobes in a desired direction.

In other embodiments, the cloud controller computer stores beamforming information to be used by the various nodes in a network. When a packet is to be transmitted between nodes in the network, the beamforming information is included in overhead information that is transmitted to the nodes so that the nodes will know the preferred orientation of the main lobe and grating lobes of its antenna array.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special-purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, or optical disks. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special-purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, comprising:
   determining a first desired beamforming direction for a main lobe and a second desired beamforming direction for a grating lobe of an antenna array having multiple antenna elements;
   controlling transmission from the antenna array using beamforming to orient a main lobe in the first desired beamforming direction, wherein controlling the transmission includes selectively delaying a time of transmission from each of the multiple antenna elements to orient the main lobe in the first desired beamforming direction;
   adjusting spacing between multiple energized antenna elements to cause the antenna array to orient a grating lobe in the second desired beamforming direction while maintaining the first desired beamforming direction of the main lobe; and
   simultaneously transmitting signals to a first node in the network in the first desired beamforming direction of the main lobe and to a second node in the network in the second desired beamforming direction of the grating lobe.

2. The method of claim 1, wherein spacing between the multiple antenna elements is adjusted by selectively energizing a subset of antenna elements in the antenna array.

3. The method of claim 1, further comprising orienting the first desired beamforming direction for the main lobe toward a first node and orienting the second desired beamforming direction for the grating lobe toward a second node, wherein the first node and the second node exchange data with each other through main lobe and the grating lobe of the antenna array.

4. The method of claim 3, further comprising:
   receiving a first signal from the first node;
   receiving a second signal from the second node;
   computing a common coded signal using the received first and second signals; and
   transmitting the common coded signal to the first node and to the second node.

5. The method of claim 4, wherein the common coded signal is computed to be decoded at the second node into the first signal, and at the first node into the second signal.

6. The method of claim 4, wherein the common coded signal is computed with an XOR operation using the first signal and the second signal.

7. The method of claim 4, wherein the common coded signal includes information that is simultaneously communicated to the first node and the second node.

8. A network node, comprising:
   an antenna array having multiple antenna elements;
   a processor;
   a beamformer component configured to orient a main lobe of the antenna array in a first desired beamforming direction, wherein the main lobe is oriented in the first desired beamforming direction by selectively delaying a time of transmission from each of the multiple antenna elements;
   an adjustment component configured to adjust spacing between multiple energized antenna elements to cause the antenna array to orient a grating lobe in a second desired beamforming direction while maintaining the first desired beamforming direction of the main lobe; and
   a transmitter component configured to simultaneously transmit signals to a first node in the network in the first beamforming direction of the main lobe and to a second node in the network in the second beamforming direction of the grating lobe.

9. The network node of claim 8, wherein the transmitter component is configured to simultaneously transmit common signals to the first node in the network in the first beamforming direction of the main lobe and to the second node in the network in the second beamforming direction of the grating lobe, wherein the common signals include information that is communicated to the first node and the second node.

10. The network node of claim 8, wherein the adjustment component is configured to selectively energize a subset of the antenna elements to orient the grating lobe.

11. The network node of claim 8, wherein the main lobe is oriented in the first desired beamforming direction toward a first node and the grating lobe is oriented in the second desired beamforming direction toward a second node, wherein the first node and the second node exchange data with each other through main lobe and the grating lobe of the antenna array.

12. The network node of claim 11, further comprising a component configured to compute a common coded signal based on a first signal received from the first node and a second signal received from the second node, wherein the transmitter component is further configured to transmit the common coded signal to the first node and the second node.

13. The network node of claim 12, wherein the common coded signal is computed to be decoded at the second node into the first signal, and at the first node into the second signal.

14. The network node of claim 12, wherein the common coded signal is computed with an XOR operation using the first signal and the second signal.

15. A non-transitory computer-readable storage device storing instructions for causing a network node to communicate in a wireless network by:
determining a first desired beamforming direction for a main lobe and a second desired beamforming direction for a grating lobe of an antenna array having multiple antenna elements;
controlling transmission from the antenna array using beamforming to orient a main lobe in the first desired beamforming direction, wherein controlling the transmission includes selectively delaying a time of transmission from each of the multiple antenna elements to orient the main lobe in the first desired beamforming direction;
adjusting spacing between multiple energized antenna elements to cause the antenna array to orient a grating lobe in the second desired beamforming direction while maintaining the first desired beamforming direction of the main lobe; and
simultaneously transmitting signals to a first node in the network in the first desired beamforming direction of the main lobe and to a second node in the network in the second desired beamforming direction of the grating lobe.

16. The non-transitory computer-readable storage device of claim 15, further comprising instructions that are executable by the processor to wherein selectively energize a subset of antenna elements in the antenna array.

17. The non-transitory computer-readable storage device of claim 15, further comprising instructions for orienting the first desired beamforming direction for the main lobe toward a first node and orienting the second desired beamforming direction for the grating lobe toward a second node, wherein the first node and the second node exchange data with each other through main lobe and the grating lobe of the antenna array.

18. The non-transitory computer-readable storage device of claim 17, further comprising:
instructions for receiving a first signal from the first node;
instructions for receiving a second signal from the second node;
instructions for computing a common coded signal using the received first and second signals; and
instructions for transmitting the common coded signal to the first node and to the second node.

19. The non-transitory computer-readable storage device of claim 18, further comprising instructions to code the common coded signal to be decoded at the second node into the first signal, and decoded at the first node into the second signal.

20. The non-transitory computer-readable storage device of claim 18, wherein the common coded signal is computed with an XOR operation using the first signal and the second signal.

* * * * *